United States Patent [19]

Gantz

[11] Patent Number: 4,466,698

[45] Date of Patent: Aug. 21, 1984

[54] EMERGENCY SIGNALLING DEVICE

[76] Inventor: William O. Gantz, 48-100 Desert Grove Dr., #22, Indio, Calif. 92201

[21] Appl. No.: 478,302

[22] Filed: Mar. 24, 1983

[51] Int. Cl.$^{3}$ .......................... G02B 5/12; G08B 5/00; A63H 33/40

[52] U.S. Cl. ...................................... 350/99; 446/176; 116/18; 116/22 R

[58] Field of Search .................. 46/53, 58; 116/1, 18, 116/22 R, 173; 350/99

[56] References Cited

U.S. PATENT DOCUMENTS

| | | | |
|---|---|---|---|
| 1,798,052 | 3/1931 | Additon | 350/99 |
| 1,823,240 | 9/1931 | Cobb | 350/99 |
| 1,906,668 | 5/1933 | Valk | 350/99 |
| 1,937,504 | 12/1933 | Bates | 350/99 |
| 2,797,621 | 7/1957 | Gladen | 350/99 |
| 3,578,840 | 5/1971 | Richards | 350/99 |
| 3,583,793 | 6/1971 | Crisogono | 350/99 |

*Primary Examiner*—Bruce Y. Arnold
*Assistant Examiner*—William Propp
*Attorney, Agent, or Firm*—I. Louis Wolk

[57] ABSTRACT

An emergency signalling device which will transmit a code signal by means of spaced reflective members rotatably mounted upon a member which may be driven by air currents. The device more particularly comprises a rotatably mounted surface such as a hemisphere upon the convex surface of which are provided spaced reflective areas of differing dimensions which will reflect flashes of different duration when exposed to sunlight corresponding to a recognizable code to transmit an emergency message such as S.O.S. Means are provided upon the said surface to permit adjustment of rate of rotation in accordance with the velocity of air currents to which it is exposed.

9 Claims, 5 Drawing Figures

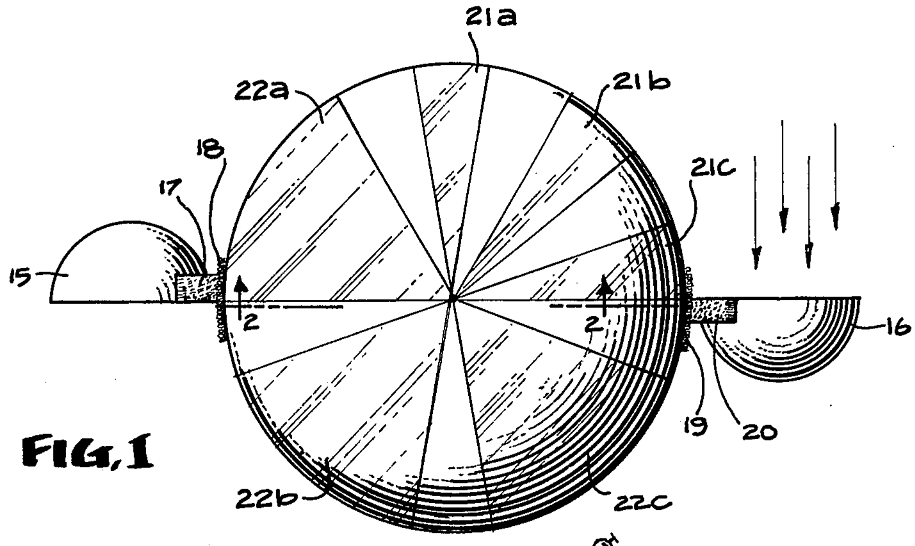
FIG.1
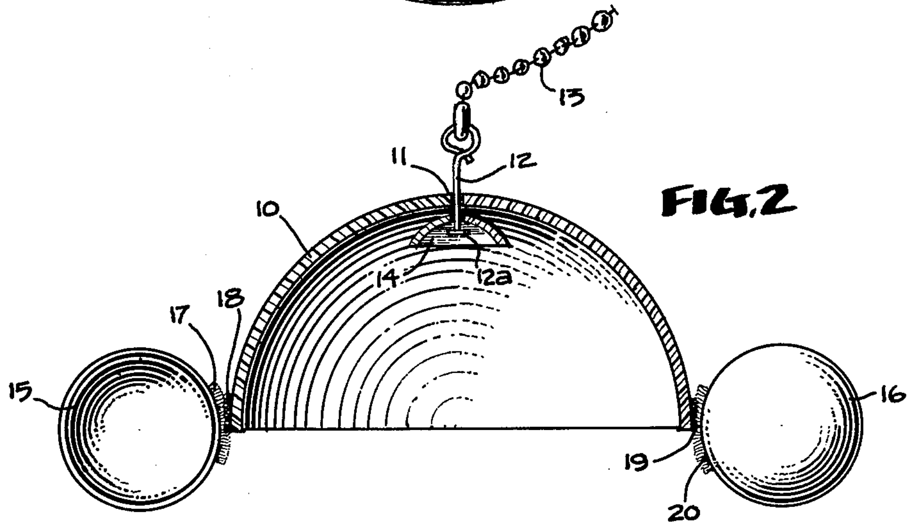
FIG.2
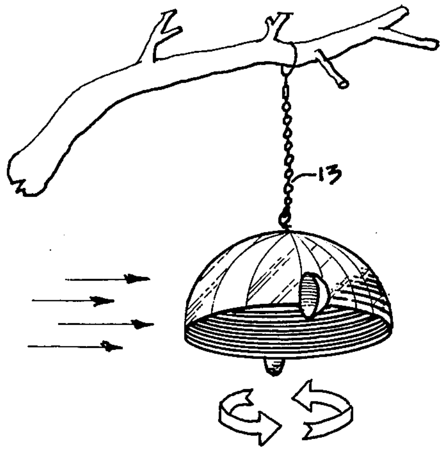
FIG.3
FIG.4
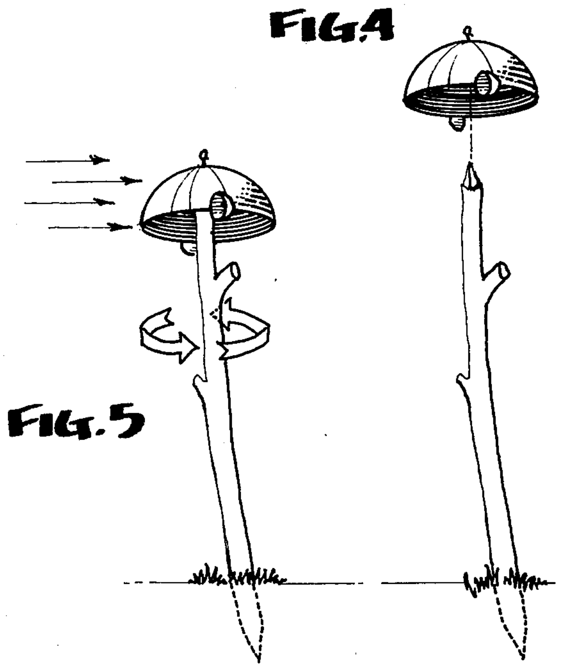
FIG.5

EMERGENCY SIGNALLING DEVICE

BACKGROUND OF THE INVENTION

The present invention relates to the field of emergency signalling devices for use by individuals who may encounter emergency situations. Such situations include being lost or injured while travelling, hiking, or camping, or by being forced down in an airplane, or in similar circumstances.

It is known to use various types of rotary reflective devices as beacons or warning devices for attachment to vehicles such as automobiles or bicycles. Such devices are shown in various patents, i.e., U.S. Pat. No. 2,797,621 as a bicycle reflector; U.S. Pat. No. 1,798,052 as a warning signal; U.S. Pat. No. 4,120,561, as a rotary warning signal made with retro-reflective material. However, none of these prior devices are designed to transmit by reflection, an intelligible coded signal or transmit a specific emergency message.

SUMMARY OF THE INVENTION

In accordance with the present invention, a rotatable member is provided with spaced reflective areas on its surface having dimensions such that reflective flashes of differing duration are transmitted, such flash periods corresponding to known telegraphic codes such as the Morse Code or the Continental Code. For example, if the message to be transmitted is S.O.S. in the Continental Code, the dimensions of the reflective areas are selected to provide three successive narrower areas corresponding to dots representing "S" and three successive wider areas, corresponding to dashes representing "O" i.e., ... ---. On horizontal rotation of the surface these dots and dashes are repeated succesively thus transmitting the message S.O.S. etc. In effect, the device functions like a heliograph transmitting the selected letters in the desired code.

As described herein by way of example, the device is fabricated by forming or placing spaced light reflective areas upon a convex surface such as a hemisphere and then providing means for permitting vertical axial rotation of the hemisphere. The hemispheric surface is provided with rotational force by means of vanes or cups attached at a plurality of points along its horizontal axis which are engaged by air currents causing the hemisphere to rotate about its vertical axis and permitting alternate flashes to be generated by reflection from the sun or other light source. In order to control the rate of rotation, depending on the velocity of ambient air, the angular position of the vanes or cups is adjustable as described.

The dimensions of the hemisphere and propelling means are selected to permit easy storage and transportation. The diameter of the hemisphere may be as small as a few inches or as large as is practical. The propelling cups or vanes may be as small as an inch or two and large enough to provide axial rotation for a hemisphere of the selected size.

As a practical matter the diameter of the hemisphere may be from about 3-12 inches and the propelling cups from 1-4 inches. The hemisphere and cups may also be provided by cutting hollow balls in half. These balls may be of rubber or plastic. If desired, the rotatable surface upon which the reflective strips are placed may be flat or in a dished contour which may be a spherical segment less than a hemisphere. An entire sphere may also be used so long as it can be suspended for rotation in a similar manner. In such case a hollow ball of the right dimension could be used.

The rotatable surface may be supported by suspension from a chain or string or wire, or may be pivotally supported by a rod or branch or any available supporting means.

For a better understanding of the invention and means for carrying it out reference may be had to the accompanying drawing and description which illustrate certain preferred embodiments of the invention.

BRIEF DESCRIPTION OF THE DRAWING

In the drawing, FIG. 1 is a top view in elevation of the device.

FIG. 2 is a partial cross section along lines 2—2 of FIG. 1.

FIG. 3 is a view in elevation of the device suspended from a tree branch.

FIGS. 4 and 5 are views in elevation, showing the device pivotally supported by a tree branch or the like placed in the ground.

DESCRIPTION OF THE PREFERRED EMBODIMENT

Referring to the drawings, as shown in FIGS. 1 and 2 a hemisphere 10 is provided with an opening 12 at its central vertical axis position through which a pin 12 is attached at a loop end to chain 13. This chain may be of the linked bead type wherein the links are rotatable. The pin 12 is supported internally of the hemisphere by a protuberance or enlarged end *12a*. To facilitate suspension and also to provide a member for pivotal support as described below, a cup-shaped member 14 is positioned surrounding the suspended member. This cup-shaped member may be of metal or plastic.

In order to provide rotational power to the hemisphere when suspended or pivotally mounted a pair of cups 15 and 16 are mounted at opposite sides at the base of the hemisphere with their open areas positioned to be impinged by an air current. In order to permit adjustable positioning of the propellent cups, they are attached to the hemisphere by means of fasteners of hook and loop type fabric such as "Velcro" as described in U.S. Pat. Nos. 2,717,437, 3,192,587, 3,387,341, etc., the opposed engaging strips of these fasteners are cemented respectively to the propellent cups and the hemisphere surfaces as shown at 17, 18, and 19, 20. When it is desired to reduce the speed of rotation and minimize the impact of the air currents upon the propellant cups, their angle of incidence to the direction of air flow can be changed by detaching them from the "Velcro" mounting strips and reattaching at the desired angle. By the same token, the direction of air flow can be accommodated by reversing the angular position of the cups accordingly. The direction of rotation will depend of course upon the direction of air flow and is immaterial since the same sequence of dots and dashes will be repeated in any direction.

Reflective strips *21a*, *21b* and *21c* which are in the form of relatively narrow triangular segments are positioned on the exposed surface of the hemisphere with their aspices at the pole of the hemisphere and their bases at the base thereof and spaced apart a desired distance. These narrow segments provide the dots for the flashed code signal "S". Similarly, the reflective segments, *22a*, *22b* and *22c* which are spaced apart and are considerably wider, provide the dashes for the flashed code signal "O". The width of the respective segments can be selected to conform to the dimensions of the rotatable surface and may range from $\frac{1}{4}$ inch to $\frac{3}{4}$ inch for the narrow segments to $\frac{1}{2}$ to 2 inches for the wider segments. (average width)

The reflective segments may be of polished thin sheet metal or foil such as copper, brass, aluminum or chrome plated metal, or of reflective metallized plastic film, etc.

As shown in FIG. 3, the assembly of FIG. 2 can be suspended from a tree branch and caused to rotate by the impact of air currents as indicated by the arrows.

FIGS. 4 and 5 illustrate the use of tree branches as pivotal supports for rotation of the device. These may be used by sharpening a branch to a point and supporting the hemisphere upon it after sticking the branch into the ground.

The use of tree branches is of course an expedient to be used where other means of support are not available or convenient.

The object of this invention is to provide an emergency signalling device which is compact and portable so that it can be carried in a pack by a camper, in a piece of luggage, or a vehicle for use in emergencies. It would be especially useful as a component of any emergency kit. In the absence of sunlight, or an night the device could still be useful since an artificial light source such as flashlight or a search light would cause the message to be transmitted. The kit could be provided with replacement reflective strips for fresh reflective surfaces, or to permit transmission of various code letter sequences, such as initials of a lost individual.

The reflective strips referred to are attached to the rotatable surface described by means of a suitable cement. If desired, the entire surface may be of reflective material and the spaces between selected reflective areas may be blacked out by means of black paint or other dark coating material.

I claim:

1. A signalling device comprising a rotatable surface having a plurality of spaced apart light reflective areas positioned thereon, said spaced areas each having a dimension sufficient to provide a reflected flash from a source of light, each of said areas having an area sufficient to provide a flash of a predetermined duration when exposed to said light source, the width and spacing of said areas conforming to a predetermined code, and means for rotating said surface whereby successive flashes will transmit an intelligible message.

2. A signalling device according to claim 1 wherein said rotatable surface is in the form of a spherical segment having its convex surface exposed to a source of light.

3. A signalling device according to claim 2 wherein said rotatable surface is in the form of a hemisphere.

4. A signalling device according to claim 3 wherein said hemisphere is vertically suspended and whereby rotation is provided by a plurality of air flow responsive impellers positioned at the base of said hemisphere.

5. A signalling device according to claim 4, wherein said impellers are angularly adjustable with respect to the direction of air flow.

6. A signalling device according to clalim 3 wherein said hemisphere is pivotally supported for rotation upon a vertical member.

7. A flasher signal device comprising: a convex surface member horiztonally rotatable around its vertical axis; a plurality of spaced reflective areas disposed upon said surface extending circumferentially from the central pole of said surface to its base, the number, spacing and dimensions of said areas being predetermined to provide a succession of flashes, when exposed to a light source and upon horizontal rotation, corresponding to a standard telegraphic code; and means for rotating said convex member.

8. A flasher signal device according to claim 7 wherein said reflective areas comprise three successive spaced relatively narrow areas and three successive spaced wider areas whereby three short flashes corresponding to dots and three longer flashes corresponding to dashes are reflected in sequence upon rotation.

9. A flasher signal according to claim 7 wherein said reflective areas comprise three successive spaced narrow areas followed by a greater space and two spaced narrow areas whereby three short flashes are followed by two short flashes in sequence upon rotation.

* * * * *